US008046342B2

(12) United States Patent
Choi

(10) Patent No.: US 8,046,342 B2
(45) Date of Patent: Oct. 25, 2011

(54) SYSTEM AND METHOD FOR PROVIDING REAL TIME ANSWERING SERVICE BY USING COMMUNICATION MEDIA CAPABLE OF TRANSMITTING AND RECEIVING DATA AND VOICE

(75) Inventor: Jung-hoi Choi, Seoul (KR)

(73) Assignee: Ismaker Co., Ltd. (KR)

( * ) Notice: Subject to any disclaimer, the term of this patent is extended or adjusted under 35 U.S.C. 154(b) by 279 days.

(21) Appl. No.: 12/306,820

(22) PCT Filed: Sep. 15, 2006

(86) PCT No.: PCT/KR2006/003698
§ 371 (c)(1),
(2), (4) Date: Dec. 29, 2008

(87) PCT Pub. No.: WO2008/004722
PCT Pub. Date: Jan. 10, 2008

(65) Prior Publication Data
US 2009/0240665 A1 Sep. 24, 2009

(30) Foreign Application Priority Data
Jul. 3, 2006 (KR) .................. 10-2006-0062061

(51) Int. Cl.
*G06F 7/00* (2006.01)
(52) U.S. Cl. ........................................... 707/705
(58) Field of Classification Search ........... 707/999.003, 707/705
See application file for complete search history.

(56) References Cited

U.S. PATENT DOCUMENTS
6,934,684 B2 * 8/2005 Alpdemir et al. ............. 704/265
2001/0032244 A1 10/2001 Neustel
(Continued)

FOREIGN PATENT DOCUMENTS
JP 2005301922 10/2005
(Continued)

OTHER PUBLICATIONS
PCT International Search Report for PCT/KR2006/003698.
(Continued)

*Primary Examiner* — Jensen Hu
(74) *Attorney, Agent, or Firm* — Hershkovitz & Associates, LLC; Abraham Hershkovitz

(57) ABSTRACT

The present invention relates to a system and method for providing a real time answering service by using communication media capable of transmitting and receiving data and voice. In accordance with the invention, there is provided a real time answering service system using communication media capable of transmitting and receiving data and voice, the system including: a questioner terminal for making out question information in real time and connecting to a real time answering service server; an answerer terminal for connecting to the real time answering service server in order to make out answer information about the question information inputted from the questioner terminal in real time; an evaluator terminal for making out evaluation information about the answer information inputted from the answerer terminal; and a real time answering service server for storing the question information inputted from the questioner terminal in a question information database; receiving from the answerer terminal the answer information about the question information inputted from the questioner terminal and storing the answer information in an answer information database; and evaluating the answer information through the evaluator terminal and providing the evaluated answer information to the questioner terminal.

2 Claims, 4 Drawing Sheets

U.S. PATENT DOCUMENTS

| | | | |
|---|---|---|---|
| 2007/0078670 A1* | 4/2007 | Dave et al. | 705/1 |
| 2007/0174244 A1* | 7/2007 | Jones | 707/3 |

FOREIGN PATENT DOCUMENTS

| | | |
|---|---|---|
| KR | 10-2000-0024451 | 5/2000 |
| KR | 2000-0054595 | 9/2000 |
| KR | 10-2001-0067711 | 7/2001 |
| KR | 10-0472668 | 7/2001 |
| KR | 10-2002-0044919 | 6/2002 |
| KR | 10-0446640 | 8/2004 |
| KR | 10-2004-0097814 | 11/2004 |
| KR | 10-2004-0098506 | 11/2004 |
| KR | 10-0487740 | 11/2004 |
| KR | 10-2005-0029097 | 3/2005 |
| KR | 10-2005-0088888 | 9/2005 |
| KR | 10-0580885 | 5/2006 |
| KR | 10-0752351 | 8/2007 |
| WO | 03 012681 A1 | 2/2003 |

OTHER PUBLICATIONS

English language abstract of KR 10-0752351.
English language abstract of KR 10-2005-0088888.
English language abstract of publication No. KR 10-2004-0097814.
English language abstract of KR 10-2005-0029097.
English language abstract of publication No. KR 10-2001-0067711.

* cited by examiner

SYSTEM AND METHOD FOR PROVIDING REAL TIME ANSWERING SERVICE BY USING COMMUNICATION MEDIA CAPABLE OF TRANSMITTING AND RECEIVING DATA AND VOICE

CROSS-REFERENCE TO RELATED APPLICATIONS

This application is a United States National Phase Patent Application which claims priority from International Application No. PCT/KR2006/003698, filed Sep. 15, 2006 which claims priority of Korean Patent Application No. 10-2006-0062061, filed Jul. 3, 2006.

STATEMENT REGARDING FEDERALLY SPONSORED RESEARCH

Not Applicable.

BACKGROUND OF THE INVENTION

1. Field of the Invention

The present invention relates to a system and method for providing a real time answering service by using communication media capable of transmitting and receiving data and voice; and, more particularly, to a system and method for providing a real time answering service by using communication media capable of transmitting and receiving data and voice, in which, if a user asks a question through the communication media, other users connected to a specific server provide answers about the question in real time.

2. Related Art

Generally, as the internet service becomes more and more popular, the internet service becomes a main means for obtaining information.

The information retrieval through the internet has a merit that users can easily obtaining information. However, since too much information are provided without a verification process, the reliability of the information cannot be assured, and it takes long time for users poor in dealing with the internet service to obtain reliable information.

Further, a conventional method for obtaining information through the internet service includes a method for obtaining information through search engines or websites for providing information; and a method for obtaining information by using a question and answer bulletin board of the internet websites.

Among the conventional method, a "NAVER knowledge IN" website service is a representative service. Through the "NAVER knowledge IN" service, users can ask questions about all subject matters and other users answer the questions.

The "NAVER knowledge IN" service has been provided as follows: a user connects to a specific website and uploads a question and then other users connects to the specific website and answer the question. Moreover, in mobile communication terminals, the "NAVER knowledge IN" service has been provided by using a WAP (Wireless Application Protocol).

However, the "NAVER knowledge IN" service has many problems in that it takes long time for users to surf many web sites in order to search information and, further, desired information can not be easily obtained in spite of undergoing the above described processes.

Furthermore, the above described service is very inconvenient because a user has to input a variety of key words but cannot receive the answers about their questions in real time.

That is, since the above described service is the service in which users find answers most similar to the answers about the their own questions among the questions and the answers, which have been stored previously, it has a demerit in which users can not receive the answers about their own questions in real time.

SUMMARY OF THE INVENTION

It is, therefore, an object of the present invention to provide a real time answering service by using communication media capable of transmitting and receiving data and voice, in which, in case users transmit questions by using communication media capable of transmitting and receiving data and voice, the users can obtain exact answers about the questions quickly.

In accordance with one aspect of the invention, there is provided a real time answering service system using communication media capable of transmitting and receiving data and voice, the system including: a questioner terminal 100 for making out question information in real time and connecting to a real time answering service server; an answerer terminal 200 for connecting to the real time answering service server in order to make out answer information about the question information inputted from the questioner terminal in real time; an evaluator terminal 500 for making out evaluation information about the answer information inputted from the answerer terminal; and a real time answering service server 400 for storing the question information inputted from the questioner terminal in a question information database; receiving from the answerer terminal the answer information about the question information inputted from the questioner terminal and storing the answer information in an answer information database; and evaluating the answer information through the evaluator terminal and providing the evaluated answer information to the questioner terminal.

In accordance with another aspect of the invention, there is provided a method for providing a real time answering service using communication media capable of transmitting and receiving data and voice, the method including the steps of: (a) inputting question information from a questioner terminal connected to a real time answering service server through communication media (step S100); (b) checking an allowable answerer terminal and transmitting the question information to the allowable answerer terminal by the real time answering service server (step S104); (c) receiving answer information from the allowable answerer terminal to which the question information is transmitted (step S106); (d) obtaining the answer information together and making out an evaluation page by the real time answering service server (step S108); (e) re-transmitting the evaluation page to answerer terminals including the answerer who makes out the answer information at step S106 (step S110); (f) evaluating answer information of other answerer except for the answerer who makes out the answer information by the answerer terminals to which the evaluation page is transmitted and transmitting the evaluation information to the real time answering service server (step S112); and (g) providing the top-scored answer information among the evaluated answer information to the questioner terminal through the corresponding communication media by the real time answering service server (step S114).

As described, the questioner can receive the answer about the question without being interrupted from the time and space as well as receive the answer evaluated from the evaluator, thereby providing the highly reliable answer.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Hereinafter, a preferred embodiment of the present invention will be described in detail with reference to the accompanying drawings. Here, it is to be noted that the present invention is not limited thereto.

Figure 1:
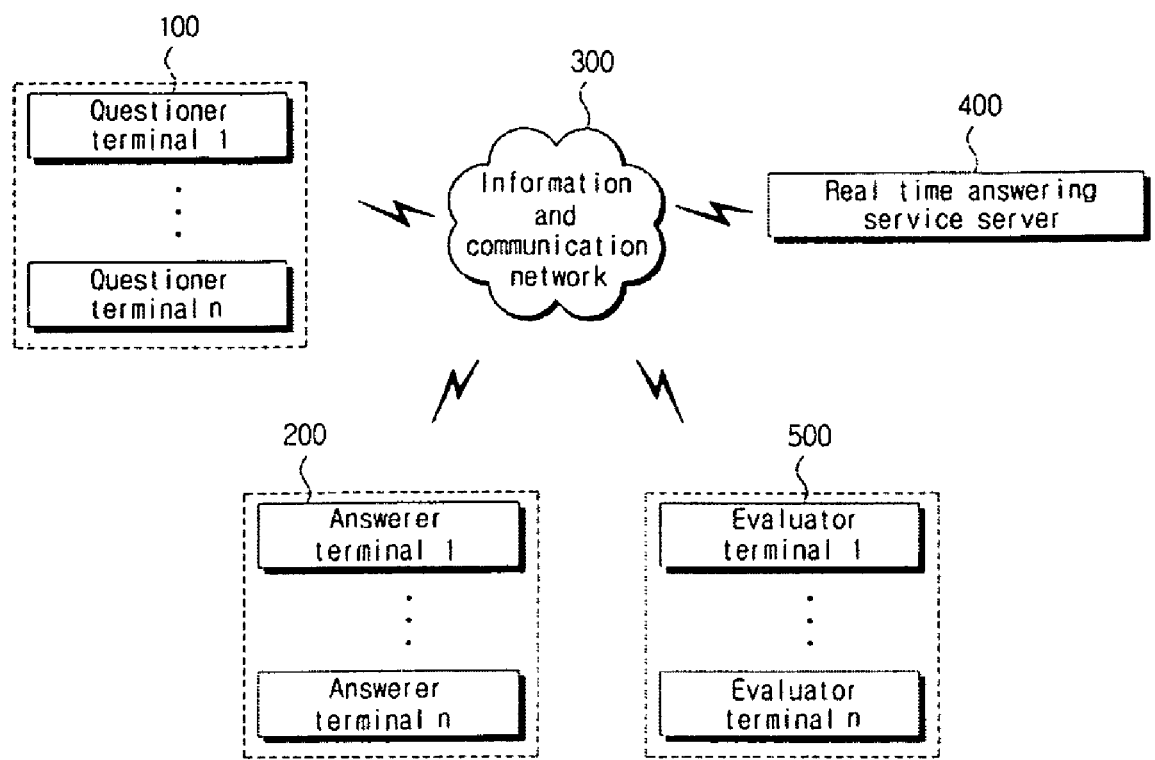
FIG. 1 is a schematic diagram of a system for providing a real time answering service in accordance with a preferred embodiment of the present invention.

FIG. 1 shows a schematic diagram of a system for providing a real time answering service in accordance with a preferred embodiment of the present invention.

As shown in FIG. 1, a real the answering service system includes a questioner terminal 100 for making out a question; an answerer terminal 200 for making out an answer about the question in real time; an evaluator terminal 500 for evaluating the answer in real time; and a real time answering service server 400, wherein the questioner terminal 100, the answerer terminal 200 and the evaluator terminal 500 are connected to the real time answering service server 400 through an information and communication network 300, and wherein the real time answering service server 400 stores the question in a question information database, receives the answer about the question and stores the answer in an answer information database, and provides the evaluated answer to the questioner terminal 100 in real time.

The questioner terminal 100, the answerer terminal 200 and the evaluator terminal 500 are, respectively, communication media, e.g., internet media, mobile communication media or voice telephone media, which are capable of transmitting and receiving data and voice.

The questioner terminal 100, the answerer terminal 200 and the evaluator terminal 500 as the internet media can be connected to the real time answering service server 400 through the information and communication network 300, and can input and output information of the real time answering service server 400 therefrom and thereto.

The questioner terminal 100, the answerer terminal 200 and the evaluator terminal 500 provide a means for allowing a questioner, an answerer and an evaluator to access the real time answering service server 400.

For example, the questioner terminal 100, the answerer terminal 200 and the evaluator terminal 500 may be personal computers or notebook computers.

Since the questioner terminal 100, the answerer terminal 200 and the evaluator terminal 500 are terminal devices capable of transmitting and receiving information data provided from the real time answering service server 400, the questioner, the answerer and the evaluator can make out or use information of the real time answering service server 400 after accessing the real time answering service server 400 through the above described terminal devices.

Further, the answerer terminal 200 in accordance with the present invention may be configured by grouping an answerer group and an evaluator group, and the evaluator terminal 500 may be additionally configured by separating the answerer group and the evaluator group.

Meanwhile, the questioner terminal 100, the answerer terminal 200 and the evaluator terminal 500 as the mobile communication media include a WAP (Wireless Application Protocol) available for a wireless internet and a VM (Virtual Machine) of a mobile application type, and communication method thereof is similar to that of the internet media described above.

Moreover, the questioner terminal 100, the answerer terminal 200 and the evaluator terminal 500 as the voice telephone media include wire/wireless telephone media.

Although the configurations of the questioner terminal 100, the answerer terminal 200 and the evaluator terminal 500 are explained separately, they may be the same terminals.

Moreover, users using the questioner terminal 100 and the answerer terminal 200 may be configured of the questioner group, a field decision maker group, the answerer group and the evaluator group.

The questioner terminal 100 and the answerer terminal 200 will be explained in detail hereinafter with reference to FIG. 3.

The information and communication network 300 provides a path for allowing the questioner terminal 100 and the answerer terminal 200 to access the real time answering service server 400. In addition, the information and communication network 300, e.g., local area network (LAN), shares the software or database by connecting the questioner terminal 100, the answerer terminal 200 and the real time answering service server 400 with each other.

Since technical configurations related to the information and communication network 300 are disclosed to the ordinary person skilled in the art, detailed description thereof will be omitted.

The real time answering service server 400 stores the question information inputted from the questioner terminal 100 in the question information database; stores the answer information about the question information in the answer information database, the answer information being inputted from the answerer terminal 200; and receives the evaluation information about the answer information from the evaluator terminal 500.

Moreover, the real time answering service server 400 stores the question information inputted from the questioner terminal 100; transmits the answer information evaluated by the evaluator terminal 500 to the questioner terminal 100; and stores therein the question information, the answer information and the evaluation information. Further, the real time answering service server 400 includes a network interface module 401, an input management module 403, a field management module 405, an output management module 407, a database 420 and a control module 410.

The real time answering service server 400 will be described with reference to FIG. 2.

Figure 2:
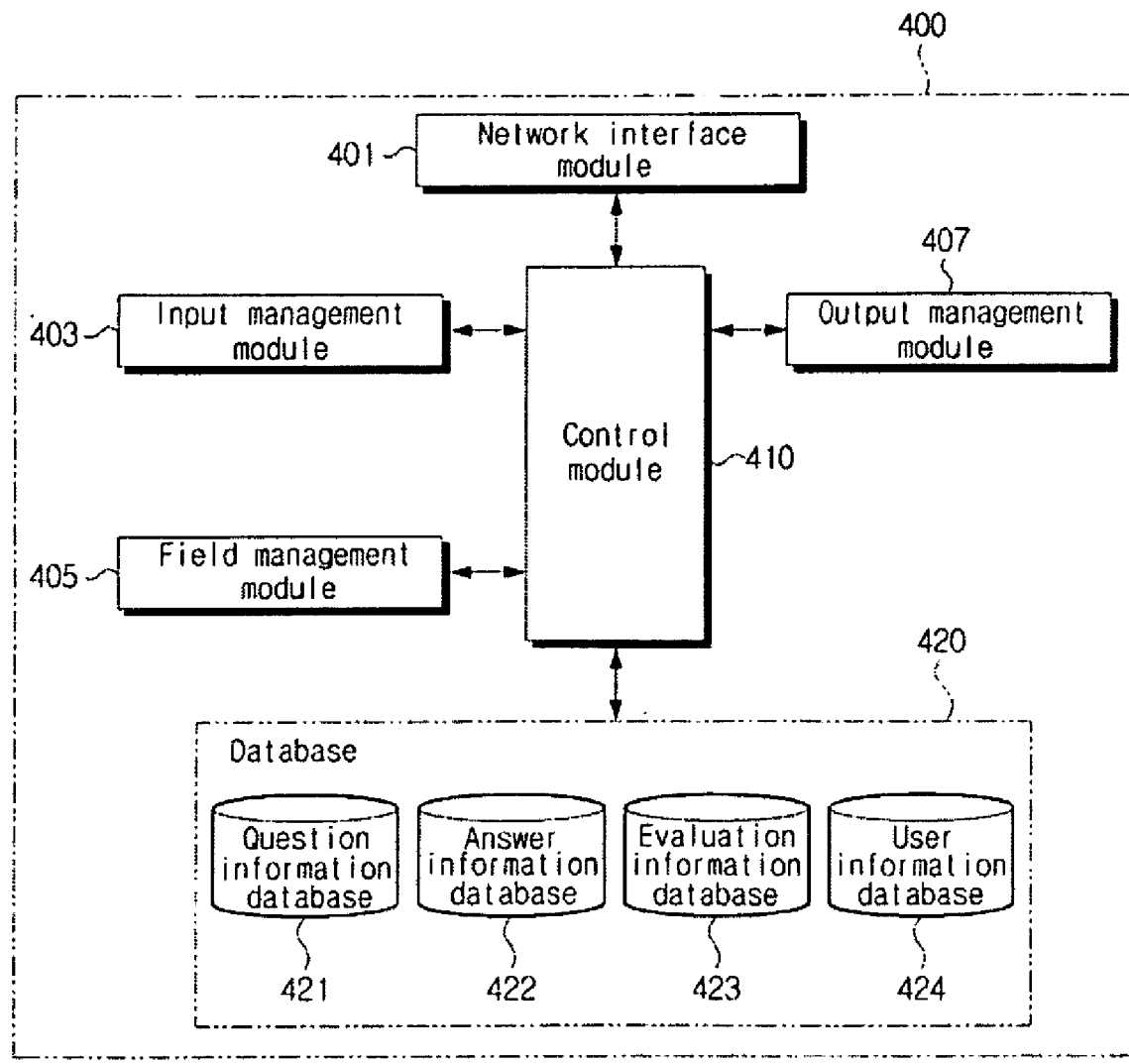
FIG. 2 sets forth a schematic inner configuration diagram of a real time answering service server in accordance with the preferred embodiment of the present invention.

FIG. 2 sets forth a schematic inner configuration diagram of the real time answering service server 400 in accordance with the preferred embodiment of the present invention.

Referring to FIG. 2, the real time answering service server 400 stores therein the question information, the answer information and the evaluation information and transmits the answer information evaluated from the evaluator terminal 500 to the questioner terminal 100. Further, the real time answering service server 400 includes a network interface module 401 for executing a network function in order to exchange data with the questioner terminal 100, the answerer terminal 200 or the evaluator terminal 500; an input management module 403 to which the question information or the evaluation information inputted from the network interface module 401 are inputted; a field management module 405 for storing therein the question information inputted from the input management module 403 in fields corresponding to the question information, the question information inputted from the input management module 403 being stored in the question information database; an output management module 407 for transmitting the information stored in the database 420 to the questioner terminal 100 or the answerer terminal 200: a database 420 in which the question information, the answer information and the evaluation information are stored; and a control module 410 for controlling the mutual processes and the data flow among the above described modules, wherein the control module 410 also allows the question information inputted from the questioner terminal 100 to be stored in the question information database; the answer information inputted from the answerer terminal 200 to be stored in the answer information database; the evaluation information inputted from the evaluation terminal 500 to be stored in the evaluation information database and user information to be stored in a user information database.

Specifically, the network interface module 401 allows the real time answering service server 400 to exchange the question information and the answer information therewith through the information and communication network 300.

The input management module 403 receives the question information inputted from the questioner terminal 100, the answer information inputted from the answerer terminal 200 and the evaluation information inputted from the evaluator terminal 500 and the control module 410 stores these information in the database 420 described later.

The field management module 405 classifies the question information inputted from the input management module 403 in fields corresponding to the question information, wherein the fields may be politics, economics, society, entertainment or etc.

Further, the field management module 405 allows users using the questioner terminal 100 or the answerer terminal 200 to classify the inputted question information.

If users are configured of the questioner group, a field decision maker group, the answerer group and the evaluator group, a field of the question information is classified by the field decision maker group in a vote method similar to the answer evaluation method before the question information are exposed to the answerer group.

The database 420 stores therein the question information, the answer information and the evaluation information inputted from the input management module 403 and the field management module 405.

Furthermore, the database 420 includes a question information database 421; an answer information database 422; an evaluation information database 423; and a user information database 424.

The question database 421 stores therein the question information inputted from the questioner terminal 100.

The answer database 422 stores therein the answer information about the question information inputted from the questioner terminal 100, the answer information being inputted from the answerer terminal 200.

The evaluation database 423 stores therein the evaluation information about the answer information inputted from the answerer terminal 100, the evaluation information being inputted from the evaluator terminal 500.

The user information database 424 stores therein the information of the questioner, the answerer and the evaluator.

Figure 3:
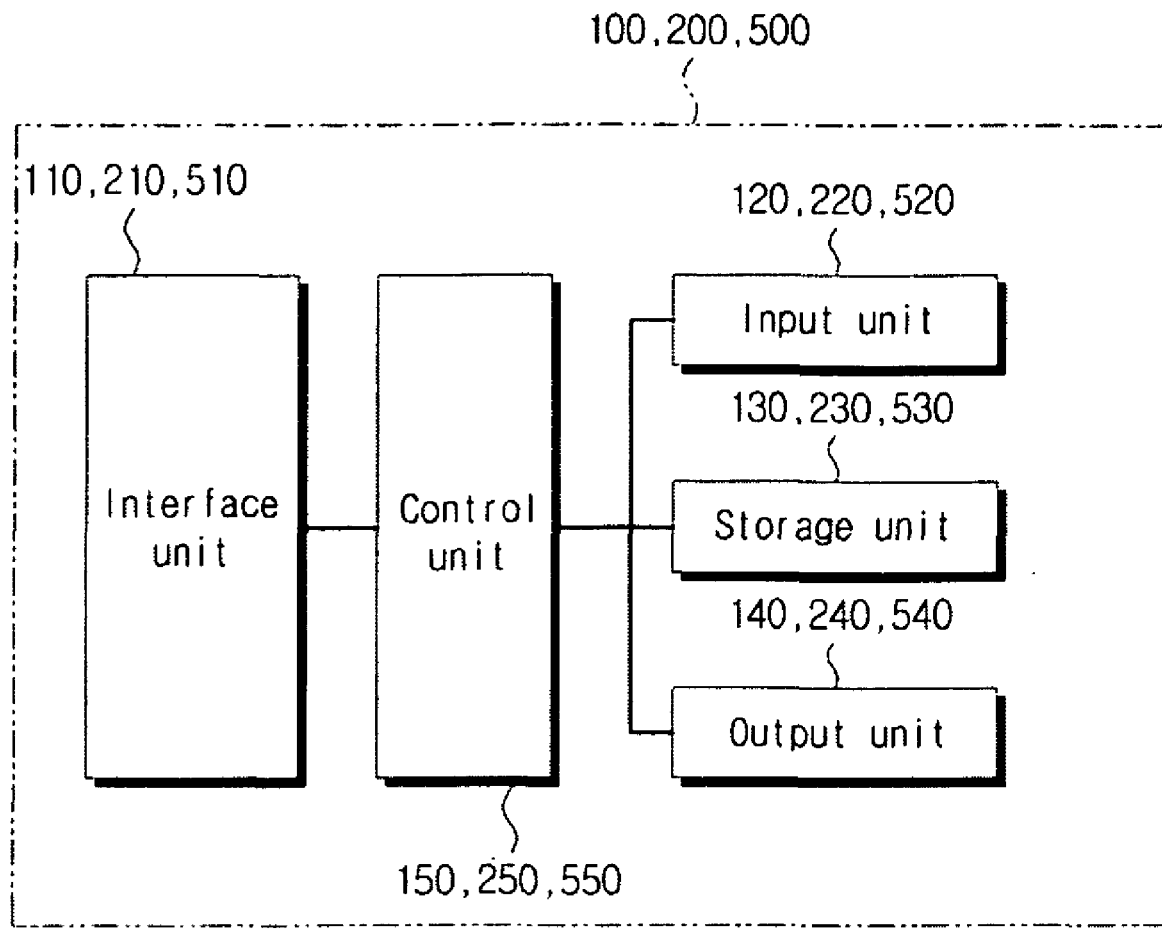
FIG. 3 presents a schematic inner configuration diagram of a questioner terminal, an answerer terminal and an evaluator terminal in accordance with the preferred embodiment of the present invention.

FIG. 3 presents a schematic inner configuration diagram of the questioner terminal 100, the answerer terminal 200 and the evaluator terminal 500 in accordance with the preferred embodiment of the present invention.

As can be seen from FIG. 3, the questioner terminal 100, the answerer terminal 200 and the evaluator terminal 500 can be connected to the real time answering service server 400 through the information and communication network 300, and can input and output information of the real time answering service server 400 therefrom and thereto.

The questioner terminal 100, the answerer terminal 200 and the evaluator terminal 500 includes, respectively, interface units 110, 210 and 510 for communicating the real time answering service server 400 therewith; input units 120, 220 and 520 to which the question information, the answer information and the evaluation information inputted from the questioner terminal 100, the answerer terminal 200 and the evaluator terminal 500 are inputted; storage units 130, 230 and 530 in which the user information, the question information, the answer information and the evaluation information inputted from the input units 120, 220 and 520 are stored; output units 140, 240 and 540 for outputting to the external terminals, e.g., the questioner terminal 100, the answerer terminal 200 or the evaluator terminal 500, the user information, the question information, the answer information and the evaluator information stored in the storage units 130, 230 and 530; control units 150, 250 and 550 for controlling each of the above described units.

The interface units 110, 210 and 510 are configured to communicate external terminals thereto, thereby receiving data.

The input units 120, 220 and 520 receive the question information, the answer information and the evaluation information from the questioner terminal 100, the answerer terminal 200 and the evaluator terminal 500 while user (questioner, answerer and evaluator) information are inputted to the input units 120, 220 and 520.

The storage units 130, 230 and 530 have therein the user information, the question information, the answer information and the evaluator information inputted from the input units 120, 220 and 520.

The output units 140, 240 and 540 output to the external terminals the user information, the question information, the answer information and the evaluator information stored in the storage units 130, 230 and 530.

The control units 150, 250 and 550 control each of the units, and also receive from the answerer terminal 200 the answer information about the question information inputted from the questioner terminal 100 and allows the answer information inputted from the answerer terminal 200 to be evaluated by the evaluator terminal 500.

Although the questioner terminal 100, the answerer terminal 200 and the evaluator terminal 500 are separately explained, these may be the same terminal.

Figure 4:
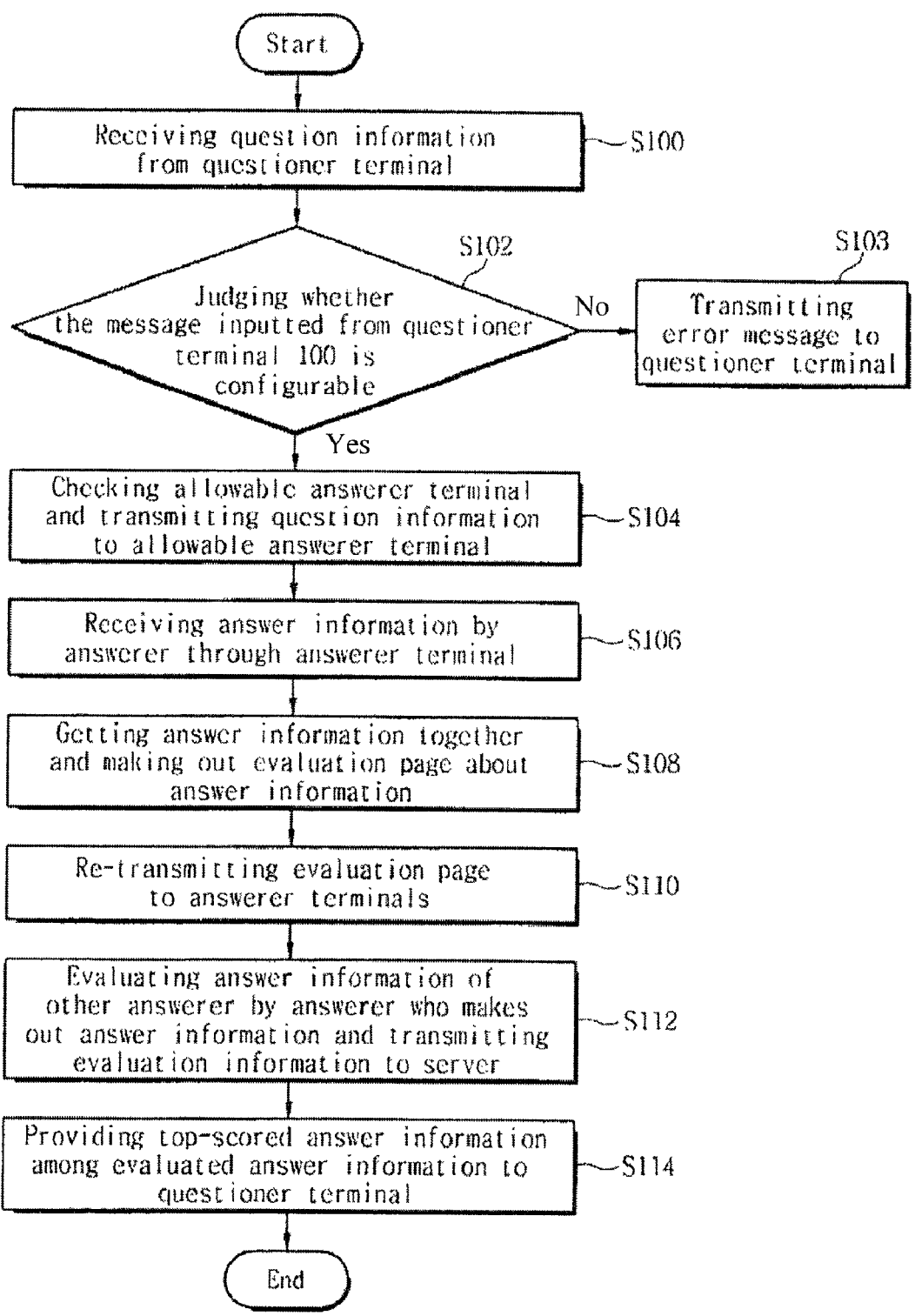
FIG. 4 provides a flowchart depicting a method for providing a real time answering service by using communication media capable of transmitting and receiving data and voice.

FIG. 4 provides a flowchart depicting a method for providing a real time answering service by using a communication media capable of transmitting and receiving data and voice.

As shown in FIG. 4, the questioner terminal 100 is connected to the real time answering service server 400 through the communication media and the question information is inputted from the questioner terminal 100. (step S100)

At step S100, the questioner terminal 100 may be allowed to be connected to the real time answering service server 400 via the internet media, the mobile communication media and the voice communication media.

If the questioner terminal 100 is connected to the real time answering service server 400 through the internet media, it is connected through a computer terminal of the questioner. Likewise, if the questioner terminal 100 is connected to the real time answering service server 400 through the mobile communication media, it is connected thorough a cell phone's short message of the questioner. Further, if the questioner terminal 100 is connected to the real time answering service server 400 through the voice communication media, it is connected through a questioner's telephone, thereby allowing the questioner to input the question information.

Next, the real time answering service server 400 executes a process for judging whether the message inputted from the questioner terminal 100 is not configurable (step S102).

If the real time answering service server 400 can not perceive the inputted message format due to the insertion of the wrong sentence or the symbol to the question information inputted from the question terminal 100 or the answerer terminal 200, the real time answering service server 400 transmits the message, that means the answer information are not provided because the message proves to be not configurable, to the questioner terminal 100 through the corresponding communication media (step S103). Otherwise, the process shifts to the step S104 described later.

After the real time answering service server 400 checks an allowable answerer terminal 200 among users connected to the real time answering service server 400 in order to answer the question, the question is transmitted to the allowable answerer terminal 200 (step S104).

At step S104, the questions inputted from the questioner terminal 100 is classified in fields.

Next, the real time answering service server 400 performs a process for receiving the answer inputted from the allowable answerer terminal 200 (step S106).

After the real time answering service server 400 gets the inputted answers together, it makes out the evaluation page about the answers (step S108).

Further, the real time answering service server 400 retransmits the evaluation page made out at the step S108 to other allowable answerer terminals including the answerer terminal 200 which makes out the answer at step S108 (step S110).

Thereafter, answerer terminals 200 receiving the evaluation page transmit results of evaluating the answers made out from other answerer terminals except for the answerer terminal, which make out the answer about the question, to the real time answering service server 400 (step S112).

When the evaluator terminal 500 evaluates the answers, the step S110 and the step S112 may be omitted.

Finally, the real time answering service server 400 executes a process for transmitting the top-scored answer among the other answers to the questioner terminal 100 through the corresponding communication media (step S114).

As described the questioner can receive the answer about the question without being interrupted from the time and space as well as receive the answer evaluated from the evaluator, thereby providing the highly reliable answer.

While the invention has been shown and described with respect to the preferred embodiments of the present invention, it will be understood by those skilled in the art that various changes and modifications may be made without departing from the spirit and scope of the invention as defined in the following claims.

What is claimed is:

1. A method for providing a real time answering service using communication media capable of transmitting and receiving data and voice, the method comprising:
    (a) inputting, by using a processor, question information from a questioner terminal connected to a real time answering service server through communication media;
    (b) checking, by using a processor, a plurality of allowable answerers and transmitting the question information to the plurality of allowable answerers by the real time answering service server;
    (c) receiving, by using a processor, a plurality of types of answer information from the plurality of allowable answerers;
    (d) creating, by using a processor, a plurality of evaluation pages associated with the plurality of types of answer information by the real time answering service server;
    (e) transmitting, by using a processor, the plurality of evaluation pages to the plurality of allowable answerers;
    (f) evaluating, by using a processor, each of the plurality of types of answer information by each of the plurality of answerers, wherein each of the plurality of answerers is prevented from evaluating his own answer information, transmitting the evaluated plurality of types of answer information to the real time answering service server, and picking a single top-scored type of answer information among the evaluated plurality of types of answer information; and
    (g) transmitting the single top-scored type of answer information to the questioner terminal through at least one of the communication media by the real time answering service server.

2. The method of claim 1 further comprising classifying the question information inputted from the questioner terminal in corresponding fields.

* * * * *